Nov. 11, 1958     G. H. TOWNER     2,860,292
DIGITAL SERVO SYSTEM

Filed April 8, 1955     2 Sheets-Sheet 1

INVENTOR:
George H. Towner
His Patent Attorney

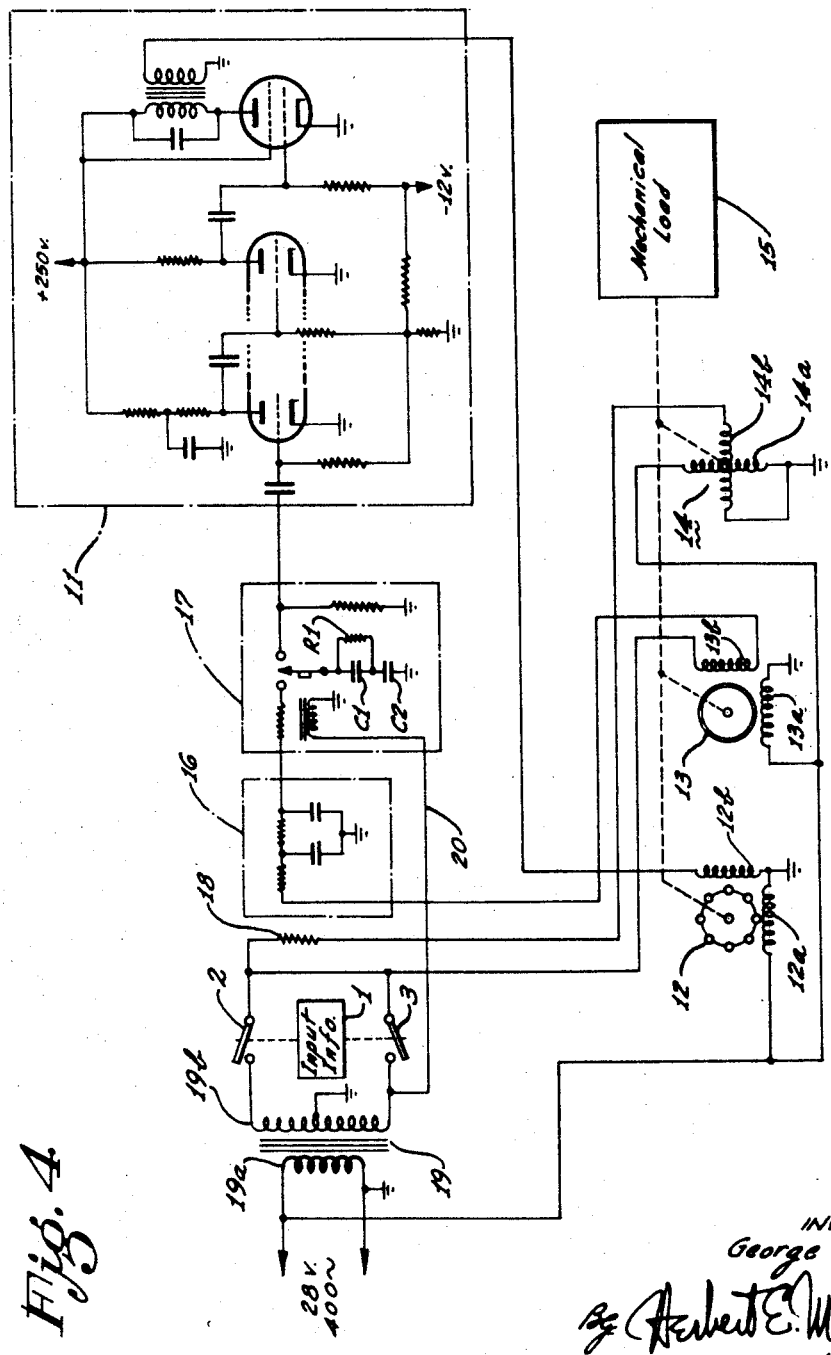

United States Patent Office 2,860,292
Patented Nov. 11, 1958

2,860,292

DIGITAL SERVO SYSTEM

George H. Towner, Inglewood, Calif., assignor to Northrop Aircraft, Inc., Hawthorne, Calif., a corporation of California Application April 8, 1955, Serial No. 500,206

14 Claims. (Cl. 318—23)

This invention relates generally to servomotors and more particularly to a servomotor system in which the motor operates in discrete and finite steps, i. e., an incremental, digital servo system.

It is an object of this invention to provide a servomotor which responds definitely to a pulse input with a single rotation of output shaft, for example, for each input pulse to the motor.

Another object of the invention is to provide a servomotor in which the rotor (output shaft) assumes an accurate and definite position with respect to the stator following each rotor rotation. For example, the rotor can rotate a single turn and stop precisely in the same position as before for each input pulse.

Another object of the invention is to provide a servomotor system in which a locking action occurs between stator and rotor when the rotor is properly oriented, to establish an accurate stop position.

A further object of this invention is to provide a servomotor system in which damping of rotor motion is provided to prevent rotor oscillations.

A still further object of the invention is to provide a digital servo system which is simple and conventional of construction, thus making such a device readily available.

Briefly, the foregoing and other objects are preferably accomplished by providing a motor having an output shaft in the form of a crankshaft which is spring loaded to a particular orientation. Two sources of power can be connected respectively to the input of the motor by suitable switching means to actuate the motor in one direction or the other. The switching means, however, are operated to provide power to the motor only for a duration of time which will rotate the crankshaft a single complete turn, for example. A mechanical load can be coupled to the crankshaft which is accurately motivated a single step by each power impulse, stopping in a definite orientation by reason of the spring loading thereon.

An electronic analogue of the mechanical system is provided which includes a motor driven generator and resolver for suitable damping and positioning of motor output shaft and load. The motor is energized by an amplifier which is preferably preceded by an integrating network and a phase shifting network. The integrating network yields very accurate output increments for the system and is particularly desired when the system must supply a high friction load, for example. When an input control switch is closed to drive the motor, the input power and the generator output power are connected in series to the motor energizing circuit, while the resolver output is effectively shorted out or disconnected by the input switching means. When no input control switch is closed, as when between input pulses, the generator output and the resolver output are connected in series to the motor energizing circuit, with the input power of course disconnected or shut off. Thus, during the "power on" times of the digital control operation, the system is connected as a velocity servo, and during "power off" time, the system is connected as a positional servo, assuming a stopping position exactly at the proper discrete incremental position.

Other objects and features will be set forth in the following description of a preferred embodiment of the invention, and the invention will be more fully understood by reference to the accompanying drawings, in which:

Figure 4 is a detailed circuit diagram for the block diagram of Figure 2.

Figure 1:
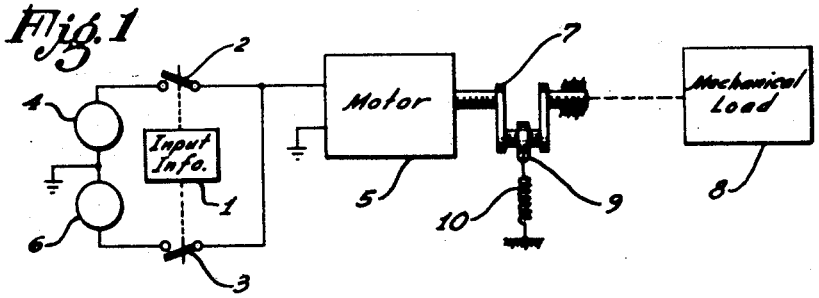
Figure 1 is a schematic diagram of a digital servo system illustrating a mechanical version of a preferred embodiment of the present invention.

Referring to Figure 1, a block 1 represents a source of input information and can be, for example, a punched tape readout device. Switches 2 and 3 are responsive respectively to punched data in separate channels on the tape and are momentarily actuated (closed) for each information hole thereon. The switches 2 and 3 are not to be operated simultaneously. The block 1 can also represent an electronic digital computer having two separate output channels. In this instance, switches 2 and 3 are each preferably contacts of a sensitive relay, the actuating coil of each relay being connected to the output of separate channels. There are clearly other devices which can be represented by the block 1.

The switch 2 is used to connect a source of power 4 to a motor 5 and the switch 3 can connect another source of power 6 to the motor 5. Power source 4 is connected in series with power source 6 and this series combination is connected between switches 2 and 3 as shown. The common junction between 4 and 6 is grounded and the poles of both switches 2 and 3 are connected by an input lead to motor 5. The circuit is completed by grounding the other input lead to the motor 5. Power source 4 is connected to motor 5 by the switch 2 in a polarity opposite to that of power source 6 which is applied to motor 5 through switch 3. Thus, the motor 5 is energized whenever a switch is closed and will rotate in one direction when switch 2 is closed and in the opposite direction when switch 3 is closed. The switches 2 and 3 can be mechanically interlocked such that simultaneous closure of both these switches is not permitted.

Two power sources 4 and 6 have been shown for clarity of illustration. However, it is clearly possible to provide a single power source and suitable switching means which can connect the source to the motor in one polarity or the other as operated.

The motor 5 can be a direct current motor as above or an alternating current motor. For an A. C. motor the power sources 4 and 6 have A. C. outputs which differ in phase by 180 degrees. The motor 5 will accordingly rotate in one direction on actuation of switch 2 and will rotate in the opposite direction on actuation of switch 3.

The output shaft of motor 5 is provided in the form of a crankshaft 7. The end of the crankshaft 7 is rotatably supported (journaled) in a bearing as shown and is mechanically coupled to drive a mechanical load 8. A collar 9 is provided on the crankpin portion of crankshaft 7 and a tension spring 10 connects collar 9 with a fixed surface (which can be that of a bracket attached to the stator frame of motor 5) to normally restrain crankshaft 7 by spring loading it in a given position or orientation. The crankshaft 7 (crankpin portion) is freely rotatable in the collar 9.

Now, maintaining the voltages at 4 and 6 at correct value and restricting each closure of a switch to a duration of time preferably such that the crankshaft 7 will rotate a single complete turn, the spring 10 returns the output shaft to a definite and precise orientation, and the load 8 is accurately motivated every time. The duration of time that a switch is to be closed must be greater than the time required for one half of a revolution of crankshaft 7 but less than one and a half turns of crankshaft 7. In this way, the operation of the switches 2 or 3 is not necessarily restricted to close time tolerances in continuous operation. Thus, the holes punched in tape or the width of output pulses from a digital computer is permitted more than adequate limits of variation without affecting the accuracy of output to a mechanical load. Of course, the motor can be energized for any time durations which are multiples of a single turn, in which instance a single output "step" is equal to a certain number of integral turns. If motor 5 is a 2 phase induction motor, damping may be obtained by running a direct current through the constantly energized winding in addition to the normal alternating current.

Figure 2:
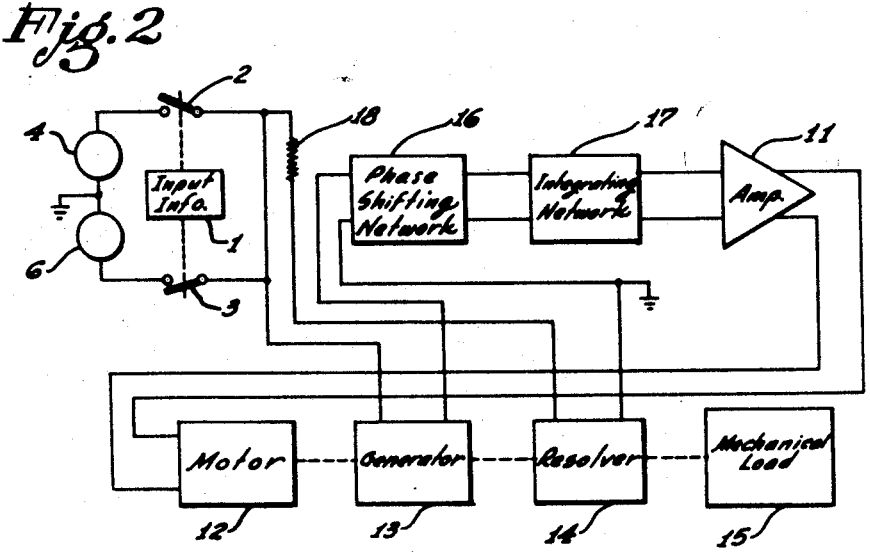
Figure 2 is a schematic block diagram of a digital servo system illustrating an electronic version of a preferred embodiment of the invention.
Figure 3:
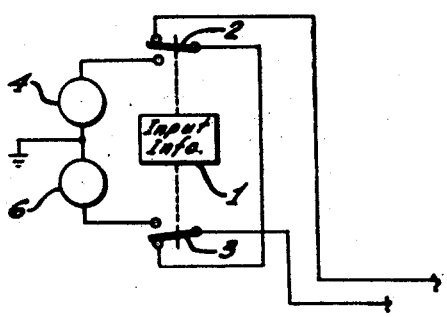
Figure 3 is a schematic diagram illustrating an alternate switching arrangement for the block diagram of Figure 2.

Figure 2 shows a block diagram of an electronic version of the invention. This is substantially an electronic analogue of the system shown in Figure 1 in which the crankshaft 7 and spring 8 are replaced by electrical elements. The power sources and connecting switches are identical to that of Figure 1 and have been similarly labeled. The power sources of Figure 2 are low impedance sources. When the power sources are of high impedance, as encountered in vacuum tube supplies, the switching arrangement of Figure 3 is preferred.

In Figure 2, the output of an amplifier 11 is connected to drive a motor 12. Mechanically coupled to the output shaft thereof is a generator 13 and a resolver 14, as well as a mechanical load 15. The poles of the switches 2 and 3 are connected through generator 13 to a phase shifting network 16 which is connected to an integrating and adding network 17. The output of the integrating and adding network 17 is connected to the input of amplifier 11. A resistance 18 connects resolver 14 to switches 2 and 3 and generator 13. The generator 13, when driven by motor 12, produces a feedback signal which is ultimately applied back to the motor 12. When a switch 2 or 3 is closed, the resolver 14 is essentially shorted out by one of the low impedance power sources and the system behaves in the manner of a velocity servo system wherein the generator feedback signal is employed for suitable velocity control and damping action. The output of the resolver 14, when the closed switch is re-opened, acts to produce a definite output shaft null position, this position being such that resolver coils (stator and rotor) are mutually perpendicular, i. e., at right angles to each other. Thus, the resolver 14 causes the system to act as a positional servo device. When the resolver is in the circuit, the generator supplies damping to prevent continuous oscillations and also to prevent any overshoot after a positioning pulse. Inclusion of the integrating and adding network 17 in the system gives very accurate output increments and is desired especially when the system must supply a high friction load or one having a sustained back force. This is because the network 17 provides what is known as "integral damping" so that any error signal from the resolver 14, caused by the output shaft tending to stop slightly off position, is integrated and builds up enough power to drive the motor to the exact null position, regardless of the high load.

The resistance 18 is a limiting resistance and is necessary to limit current flow when a switch is closed connecting a low impedance power source to the resolver 14. The switching arrangement shown in Figure 3 avoids the use of a limiting resistance and functions to disconnect the resolver 14 from a high impedance power source whenever a switch 2 or 3 is actuated and to connect the output of resolver 14 in series with that of generator 13 when the actuated switch is returned to normal position. Switches 2 and 3 are shown in normal positions in Figure 3. When the resolver 14 is disconnected, system velocity control is supplied by generator 13 and when resolver 14 is inserted back in the circuit, it provides suitable positioning action as was obtained in Figure 2. The lead connecting with the pole of switch 3 connects with generator 13 similarly as in Figure 2, whereas the upper lead connecting with a contact of switch 2 connects directly to resolver 14 and the resistance 18 of Figure 2 is omitted. It is noted that switches 2 and 3 are connected in series in Figure 3, connecting generator 13 to resolver 14.

A detailed wiring diagram of the preferred embodiment of the invention shown in block diagram form in Figure 2 is given in Figure 4. The switches 2 and 3 are connected as is Figure 2 and are responsive to input information from source 1 as before. Primary 19a of transformer 19 is connected to 28 volts at 400 C. P. S. One side of the primary 19a is also connected to ground and the other side is connected to reference windings of motor 12, generator 13 and resolver 14. The secondary 19b of transformer 19 is center tapped to ground and the secondary winding ends are connected to switches 2 and 3 as shown. The upper half of secondary 19b corresponds to the power source 4 and the lower half corresponds to the power source 6 having a 180 degree phase difference output.

The poles of switches 2 and 3 in Figure 4 are electrically connected together as shown and connect with the input of the 90 degree phase shifting network 16 through winding 13b of generator 13. The phase shifting network 16 produces a proper phase signal for winding 12b. The output of network 16 is connected to an integrating chopper network 17. This particular network functions uniquely in servo systems and is fully described and claimed in applicant's copending patent application, Serial No. 422,545, filed April 12, 1954. Integrating network 17 output is provided to a three stage amplifier 11. If the integrator network 17 is not desired and is omitted because of the nature of the mechanical load 15, then the input of amplifier 11 can be connected directly to the output of phase shifting network 16. The integrator 17 and 90 degree phase shifter 16 can be located in between the various tube stages to reduce electrical noise as required. In the instance of omission of the integrator 17, it is also possible to omit the phase shifting network 16 by adding suitable capacitors in the plate circuits of the tubes. The phase shifter 16 must precede the integrator 17 if the latter is included in the system.

The chopper design is such that the vibrating reed lags the excitation coil voltage by 90 degrees, hence phase shifter 16 is added so that the input signal to the integrator will be in phase with the chopper reed. The reed is referred to the input signal phase by lead 20 to transformer 19. The 90 degree reed phase lag causes the output of the integrator to shift 90 degrees with respect to the motor reference winding 12a voltage thus giving the required phase to drive motor 12. The direct coupling output loop (for high frequency response) from the integrating network 17 is completed through capacitance C1 and resistance R1 and is of short time constant. The integrator loop (long time constant for low frequency response) includes capacitance C2 and resistance R1.

The output of amplifier 11 is transformer coupled to winding 12b of motor 12. Reference winding 12a is energized directly from the A. C. line. Motor 12 is mechanically coupled to drive generator 13 (a drag cup type, for example), the reference winding 13a of which is also directly energized from the A. C. line. Winding 13b is, however, connected in series with the poles of switches 2 and 3 to the input of phase shifting network 16 providing a feedback signal thereto for suitable damping. The motor 12 also drives winding 14b of resolver 14, the reference (stator, for example) winding 14a being energized from the A. C. line. Winding 14b is connected to generator winding 13b through resistance 18, as shown. This winding 14b is rotatable and assumes a stable position in which it is at right angles to winding 14a. Thus, the resolver 14 ensures the acquisition of an accurate stop position of output shaft following each increment or step operation.

The resolver 14 is preferably replaced by a microsyn, a device in which both windings are stationary and coupling is provided through a soft iron rotor. This, of course, eliminates the need for slip rings, and their attendant maintenance difficulties are avoided. The resolver 14 was illustrated because of its construction which is functionally more descriptive. The motor 12, generator 13 and resolver 14 can have multiple poles in which instance the output shaft will rotate in definite, discrete fractions of a turn according to the structure of those devices.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. A digital servo system adapted to be driven by pulsed switching operations, comprising: power source means; a motor having a mechanical output shaft; first switching means for connecting said power source means to said motor to energize said motor in one direction; second switching means for connecting said power source means to said motor to energize said motor in another direction; means for damping output shaft motion and means for positioning said output shaft in a reference orientation with respect to the stator of said motor when in a static condition with said motor de-energized from said power source; and means for operating said first and second switching means, not simultaneously, whereby, when the closed time of each switching operation is for a time duration substantially equal to the time required for an integral number of revolution fractions of said output shaft, such as a single whole revolution, said output shaft is actuated in discrete increments corresponding respectively to any number of switching operations.

2. Apparatus in accordance with claim 1 wherein said switch operating means controls operation of said switching means to within time limits of half a revolution fraction of said output shaft, for accurate output increments.

3. Apparatus in accordance with claim 1 wherein said damping means and positioning means includes a crankshaft rigidly connected to said output shaft; and means for spring loading said crankshaft to a reference orientation.

4. Apparatus in accordance with claim 1 wherein said damping means and positioning means includes a generator connected to said output shaft; a resolver connected to said output shaft; and means connecting the outputs of said generator and resolver for feedback thereof to said motor.

5. A digital servo system adapted to be driven incrementally by electrical input pulses, comprising: power source means; a motor having a mechanical output crankshaft; a collar provided on the crankpin portion of said crankshaft; a tension spring fixed on one end and connecting with said collar on the other end for positioning said output crankshaft in a reference orientation; first switching means for connecting said power source means to said motor to energize said motor in one direction; second switching means for connecting said power source means to said motor to energize said motor in another direction; and means for operating said first and second switching means, not simultaneously, whereby, when the closed time of each switching operation is for a time duration substantially equal to the time required for a single whole revolution of said crankshaft, said output crankshaft is actuated in discrete increments.

6. A digital servo system adapted to be driven incrementally by electrical input pulses, comprising: a first and a second power source; a motor having a mechanical output shaft; a generator connected to said output shaft; a resolver connected to said output shaft; first switching means connected to said first power source; second switching means connected to said second power source in an opposite phase; an amplifier, the output of said amplifier being connected to the input of said motor, and the output of said generator connected in series with said first and second switching means; means connecting said generator output to the input of said amplifier; means connecting the output of said resolver to said first and second switching means; and means for operating said first and second switching means, not simultaneously, whereby, when the closed time of each switching operation is for a time duration substantially equal to the time required for an integral number of revolution fractions of said output shaft, such as a single whole revolution, said output shaft is actuated in discrete increments.

7. Apparatus in accordance with claim 6 wherein said switch operating means controls operation of said switching means to within time limits of half a revolution fraction of said output shaft, for accurate increments.

8. Apparatus in accordance with claim 6 wherein said means connecting said generator output to said amplifier input includes a phase shifting network and an integrating chopper network connecting said generator output to said amplifier input whereby accurate output shaft increments are obtained for a high friction load.

9. A digital servo system, comprising: a first and a second power source; a motor having a mechanical output shaft; a generator connected to said output shaft; a resolver connected to said output shaft; a first two-position switching means connected to said first power source; a second two position switching means connected to said second power source in an opposite phase; an amplifier, said amplifier output being connected to said motor input, said resolver output being connected in series with said generator output through said first switching means and said second switching means in their unactuated positions; means connecting said generator output to said amplifier input; and means for operating said first and second switching means, not simultaneously, for disconnecting said resolver output and connecting a power source through said generator output to said amplifier input, whereby, when the closed time of each switching operation is for a time duration substantially equal to the time required for an integral number of revolution fractions of said output shaft, such as a single revolution, said output shaft is actuated in discrete increments.

10. Apparatus in accordance with claim 9 wherein said switch operating means controls operation of said switching means to within time limits of half a revolution fraction of said output shaft, for accurate output increments.

11. Apparatus in accordance with claim 9 wherein said means connecting said generator output to said amplifier input includes a phase shifting network and an integrating chopper network connecting said generator output to said amplifier input whereby accurate output shaft increments are obtained for a load having a sustained back force.

12. A digital servo system, comprising: a transformer having a primary winding adapted to be energized by a reference signal and a center-tapped secondary winding for providing a first and second power source; a two phase motor having a mechanical output shaft; a two phase generator connected to said output shaft; a two phase resolver connected to said output shaft, a phase winding respectively of said motor, generator and resolver being energized by said reference signal; a first switch connected to said first power source; a second switch connected to said second power source; a 90 degree phase shifting network, the other phase winding of said generator connecting said first and second switches to said phase shifting network input; an amplifier, said amplifier input being connected to said phase shifting circuit output and said amplifier output being connected to the other phase winding of said motor; resistance means connecting the other phase winding of said resolver to said first and second switches; and means for operating said first and second switches, not simultaneously, whereby, when the closed time of each switching operation is for a time duration substantially equal to the time required for an integral number of revolution fractions of said output shaft, such as a single revolution, said output shaft is operated in discrete increments.

13. Apparatus in accordance with claim 12 wherein said switch operating means controls operation of said switches to within time limits of half a revolution of said output shaft, for accurate output increments.

14. Apparatus in accordance with claim 12 including in addition, an integrating chopper network connecting said phase shifting circuit to said amplifier whereby accurate output shaft increments are obtained for a high friction load.

References Cited in the file of this patent

UNITED STATES PATENTS

| | | |
|---|---|---|
| 2,402,928 | Summers | June 25, 1946 |
| 2,461,511 | Baecher | Feb. 15, 1949 |
| 2,502,167 | Moore | Mar. 28, 1950 |
| 2,715,703 | Shuck | Aug. 16, 1955 |